United States Patent
Zilberstein et al.

(10) Patent No.: US 9,848,241 B2
(45) Date of Patent: Dec. 19, 2017

(54) INCREASED USER EFFICIENCY AND INTERACTION PERFORMANCE THROUGH DYNAMIC ADJUSTMENT OF AUXILIARY CONTENT DURATION

(71) Applicant: Microsoft Technology Licensing, LLC, Redmond, WA (US)

(72) Inventors: Karin Zilberstein, Kirkland, WA (US); Diana Finster, Seattle, WA (US); Adrian Chiu, Bellevue, WA (US); Alexei Pineda, Sammamish, WA (US); Stuti Jain, Kirkland, WA (US); Enrique de la Garza, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 14/534,161

(22) Filed: Nov. 5, 2014

(65) Prior Publication Data

US 2016/0127776 A1    May 5, 2016

(51) Int. Cl.
*H04N 21/458* (2011.01)
*H04N 21/262* (2011.01)
*H04N 21/235* (2011.01)
*H04N 21/462* (2011.01)
(Continued)

(52) U.S. Cl.
CPC ....... *H04N 21/458* (2013.01); *G06Q 30/0277* (2013.01); *H04N 21/2353* (2013.01);
(Continued)

(58) Field of Classification Search
CPC .. H04N 21/812; H04N 21/854; H04N 21/236; H04N 21/8455; H04N 21/42201;
(Continued)

(56) References Cited

U.S. PATENT DOCUMENTS

2002/0042914 A1 *  4/2002  Walker .................. G06Q 30/02
                                                           725/36
2002/0120929 A1     8/2002  Schwalb et al.
(Continued)

FOREIGN PATENT DOCUMENTS

WO        2013053038 A1     4/2013

OTHER PUBLICATIONS

"International Search Report and Written Opinion Issued in PCT Application No. PCT/US2015/059121", dated Jan. 15, 2016, 12 Pages.

*Primary Examiner* — Rong Le
(74) *Attorney, Agent, or Firm* — The Watson IP Group, PLC; Vladan M. Vasiljevic

(57) ABSTRACT

Improved operation of a content presentation device is achieved by displaying, to a user, user-desired primary content on the physical display device. Content pod metadata can be received specifying a predefined duration of a content pod for displaying auxiliary content, different from primary content, within a break from the primary content for the predetermined duration. The content pod metadata also specifies a plurality of subdivision time slots of the content pod, each time slot for different auxiliary content. The auxiliary content can be displayed on the physical display device within a time slot of the content pod. User input can be received while displaying the auxiliary content on the physical display device, where the user input indicates user interest in the auxiliary content. The auxiliary content can then be adjusted based on the user interest in the auxiliary content.

21 Claims, 6 Drawing Sheets

(51) Int. Cl.
- *H04N 21/426* (2011.01)
- *H04N 21/435* (2011.01)
- *H04N 21/438* (2011.01)
- *H04N 21/2668* (2011.01)
- *H04N 21/81* (2011.01)
- *G06Q 30/02* (2012.01)

(52) U.S. Cl.
CPC ... *H04N 21/2668* (2013.01); *H04N 21/26283* (2013.01); *H04N 21/42653* (2013.01); *H04N 21/435* (2013.01); *H04N 21/438* (2013.01); *H04N 21/4622* (2013.01); *H04N 21/812* (2013.01)

(58) Field of Classification Search
CPC ......... H04N 21/42203; H04N 21/4223; H04N 21/4394; H04N 21/44008; H04N 21/4402; H04N 21/44218; H04N 21/233; H04N 21/4104; H04N 21/411; H04N 21/4122; H04N 21/4131; H04N 21/4135; H04N 21/4147; H04N 1/32144
See application file for complete search history.

(56) References Cited

U.S. PATENT DOCUMENTS

| | | |
|---|---|---|
| 2002/0124250 A1 | 9/2002 | Proehl et al. |
| 2008/0229354 A1 | 9/2008 | Morris et al. |
| 2008/0243610 A1 | 10/2008 | Ragno et al. |
| 2009/0018920 A1 | 1/2009 | Lerman et al. |
| 2009/0210899 A1 | 8/2009 | Lawrence et al. |
| 2009/0254932 A1 | 10/2009 | Wang et al. |
| 2010/0161424 A1* | 6/2010 | Sylvain .............. G06Q 30/0269 705/14.66 |
| 2010/0175079 A1 | 7/2010 | Braun et al. |
| 2010/0205049 A1* | 8/2010 | Long ..................... G06Q 30/02 705/14.5 |
| 2011/0078002 A1 | 3/2011 | Leary et al. |
| 2012/0084807 A1 | 4/2012 | Thompson et al. |
| 2013/0205333 A1 | 8/2013 | Han et al. |
| 2014/0020017 A1* | 1/2014 | Stern ................ H04N 21/23611 725/34 |
| 2014/0149210 A1 | 5/2014 | Ma et al. |

\* cited by examiner

INCREASED USER EFFICIENCY AND INTERACTION PERFORMANCE THROUGH DYNAMIC ADJUSTMENT OF AUXILIARY CONTENT DURATION

BACKGROUND

Much of the content that is consumed by individuals is supported, at least in part, through advertising revenue. For example, network television shows, and, even prior to that, radio broadcasts, were funded through the sale of advertising wherein advertisers paid for the right to present advertisements to the audience of such shows and broadcasts. As another example, print media, such as magazines and newspapers, are paid by advertisers to include printed advertisements, with such advertiser payments reducing the amount subscribers of such print media would otherwise have to pay to access the content printed thereon.

Because a diverse set of individuals can consume various content, such as television shows, or newspapers, the advertising included with such content necessarily is exposed to both individuals to whom such advertising is relevant, and individuals that have no interest in the advertised product or service. Additionally, because information about the individuals consuming such content is often unavailable, and because there is no prior knowledge on which individuals will consume which content, it can be difficult to determine beforehand which advertising will be relevant. As a result, individuals have become accustomed to finding advertisements irrelevant for their particular needs and ignoring such advertisements. Indeed, many consumers of advertising-supported content have trained themselves to purposely ignore advertisements; a behavior known as "ad blindness." For example, readers of newspapers or magazines visually skip over advertisements often without noticing the advertisements sufficiently in order to actually determine whether or not such advertisements are of interest. As another example, watchers of network television shows often perform other actions during displayed advertising, or utilize devices, such as digital video recorders that enable such watchers to fast-forward or skip over advertising without actually considering the advertising content.

From an advertiser perspective, however, such actions are undesirable because they reduce the likelihood of individuals purchasing or using the advertised products or services. To counter such "ad blindness", advertisers desire to present to users advertisements that more effectively capture users' attention, and are, thereby, more engaging to such users.

SUMMARY

The duration of the presentation of auxiliary content, such as advertisements, can be dynamically adjusted based on determined user interest, thereby increasing user efficiency and interaction performance. Primary content that is user desired, such as advertising-supported content, can be displayed on a physical display device. Before or during the displaying of the primary content, metadata can be received specifying a predefined duration of a "pod" of auxiliary content that is different from the primary content, and which is displayed during an interruption in the primary content for the duration specified by the pod metadata. The content pod metadata can also specify a plurality of subdivisions or time slots within the content pod, where each time slot can be for independent auxiliary content that can be independent from the auxiliary content of any other time slot. The auxiliary content can be received with the content pod metadata or separately from the content pod metadata. The auxiliary content can differ from the user-desired primary content and can be displayed on the physical display device within a time slot of the content pod during an interruption, or break, from the primary content. User input can be received while displaying the auxiliary content on the physical display device. The user input can be explicit or implicit and can indicate user interest in the auxiliary content. The auxiliary content can then be adjusted based on determined user interest in the auxiliary content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
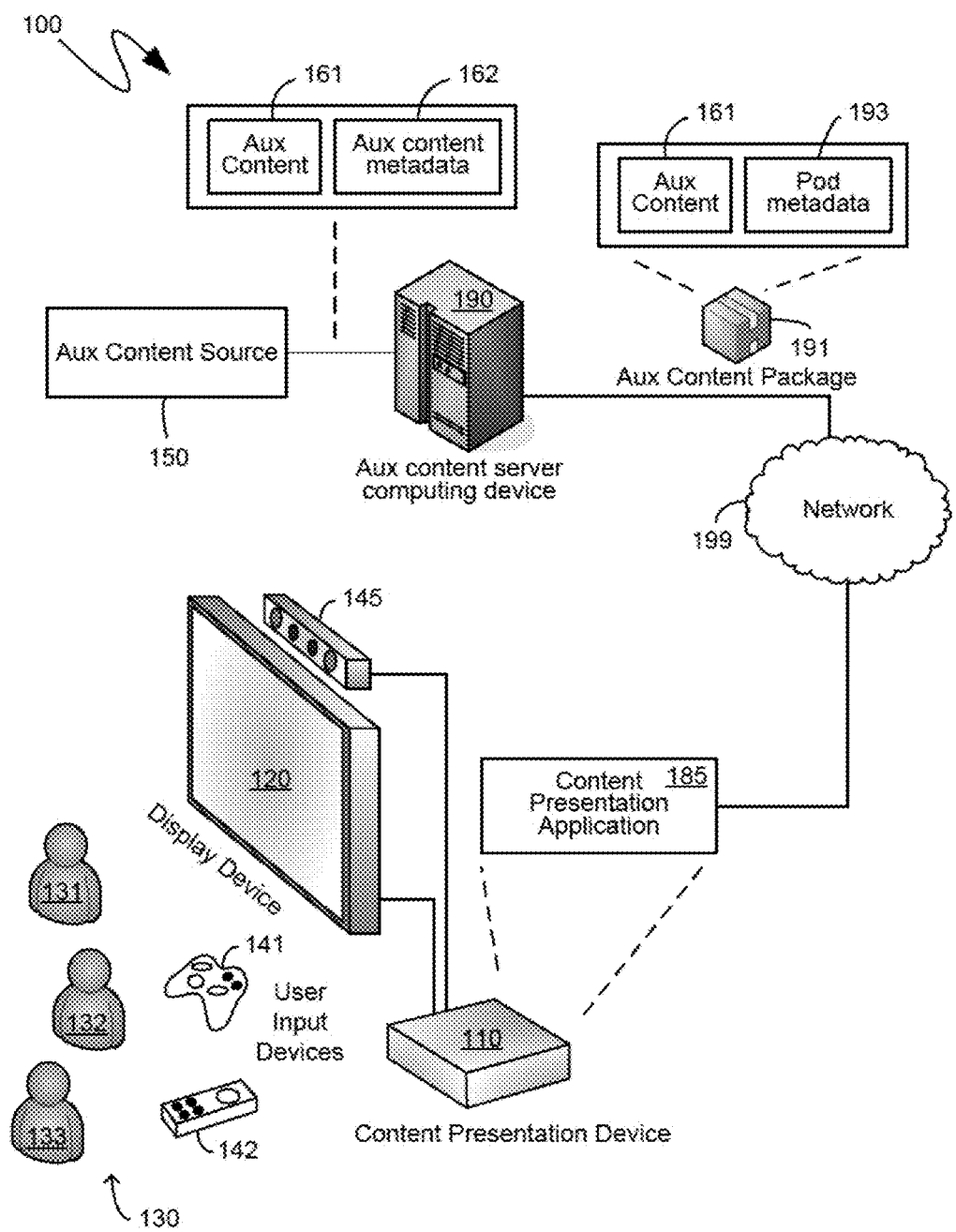
FIG. 1 is a block diagram of an exemplary system for dynamic auxiliary content duration adjustment.

The following description relates to both increasing the efficiency with which users consume content and also increasing user interaction performance by dynamically adjusting the duration of the presentation of auxiliary content on a physical display device that is communicationally coupled to a content presentation computing device on which a content presentation program executes and presents content to users through the physical rendering of such content on the physical display device. The presented content can include primary content that is user desired or selected, such as advertising-sponsored content, as well as auxiliary content, such as advertisements, that differs from such primary content and which is presented to users during an interruption, or break, in the presentation of the primary content. Before, or while, displaying the primary content, metadata can be received specifying a predefined duration of a "pod" for displaying the auxiliary content. The pod metadata can also specify a plurality of subdivisions, or time slots, of the content pod, where each time slot can be for independent auxiliary content that can be independent of the auxiliary content of any other time slot. The auxiliary content can be received with the content pod metadata, or it can be received separately from the content pod metadata. Explicit or implicit user input can be received while the auxiliary content is being generated and displayed to users on the physical display device, and such user input can indicate user interest in the auxiliary content. The auxiliary content that is displayed to users can then be adjusted based on a determined user interest in the auxiliary content, thereby increasing the interaction performance of users with the desired auxiliary content, while simultaneously increasing user efficiency in viewing the primary content and in not viewing extended auxiliary content that users find undesirable.

Techniques described herein can relate to advertising within the context of the consumption of advertising-sponsored content, which can be considered to be user-desired primary content in that a user sought to consume such content and advertisements or other auxiliary content are presented as a condition of the user's consumption of such content at a particular cost, which is typically a reduced cost, or free, due to the fact that such content is, at least in part, advertising-sponsored. However, such descriptions are not meant to suggest a limitation of the described techniques. To the contrary, the described techniques are equally applicable to any environment in which auxiliary content is presented to users during a break, or interruption, in primary content.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other devices capable of executing the computer-executable instructions in the manner intended to produce the desired results, including handheld devices, multi-processor systems, microprocessor based or programmable consumer electronics, network PCs, minicomputers, mainframe computers, video game consoles, digital video recorders, audio and/or video content presentation devices and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and other like hardware logic components and devices.

Turning to FIG. 1, an exemplary system 100 is illustrated, providing context for the descriptions below. As illustrated in FIG. 1, the exemplary system 100 can comprise a content presentation device 110 that can be communicationally coupled to a physical display device 120. The physical display device 120 can be any type of display device, including Liquid Crystal Display (LCD) devices, plasma-based devices, Organic Light Emitting Diode (OLED) devices, phosphorus-based devices, projector devices, touch screen devices, and other display devices that can generate a viewable physical image. As will be recognized by those skilled in the art, such display devices generate images through the manipulation of discrete, physical elements that, in aggregate, comprise the image being presented by the display device. For example, an LCD-based device generates images through the physical orientation of individual, physical liquid crystals, which, in aggregate, form the image being presented by the LCD-based device.

The content presentation device 110 can be any device having sufficient processing capability to execute the computer-executable instructions, and perform the steps, described herein. For example, the content presentation device 110 can be a video game console, a streaming media device, a digital video recorder, a set-top box provided by a content or network provider, or any of the above-enumerated computing devices. The content presentation device 110 can further comprise sufficient hardware and software capability to control a display device, such as the display device 120, in order to cause the display device 120 to generate images thereon. One or more users, such as the users 131, 132 and 133, collectively referred to as the users 130, can utilize the content presentation device 110 to consume content displayed by the content presentation device 110 via the physical display device 120. The users 130 can interface with the content presentation device 110 through various user input devices including, for example, a conventional remote control 142, a video game controller 141, an audio/visual input device 145, as well as more traditional computer input devices, such as a trackpad, a mouse, keyboard, and other user input devices, which are not explicitly illustrated in the exemplary system 100 shown in FIG. 1. As will be recognized by those skilled in the art, the audio/visual input device 145 can comprise sensors by which the physical appearance and physical movements of the user, as well as audio generated by the user, can be utilized to provide user input, such as to the content presentation device 110.

The content presentation device 110 can display, on the display device 120, content that can be consumed by multiple users, such as the users 130, simultaneously. In such instances, only some of the users 130 may be actively controlling the content presentation device 110, while others of the users 130 may be merely viewing the content being generated on the physical display device 120. Consequently, as utilized herein, the term "user" means any individual that consumes content presented by a device, irrespective of whether such an individual is actively controlling the device, or the content presented thereby, or is merely consuming the content without active control.

In certain instances, the content presented by the content presentation device 110 can include user-desired, primary content that is advertising-supported content. Such advertising-supported content can include television shows, movies, video games, and other like advertising-supported content. Typically, such advertising-supported content, or primary content, will be presented to the users 130, by the content presentation device 110, during defined periods of time, defined instances, or defined circumstances. At other times, namely during interruptions, or breaks, in the primary content, when such primary content is, temporarily not being displayed to the users 130, by the content presentation device 110, auxiliary content, such as in the form of advertisements or other information can be presented. Such breaks, or interruptions, in the primary content are typically referred to as "ad breaks", and can include blocks of predefined duration occurring at defined intervals or instances in time during the presentation of advertising-supported content, such as television shows and movies. Alternatively, or in addition, interruptions in the primary content can include blocks of predefined duration that can be triggered by events within the context of the primary content, such as within the context of a video game when a game player exits the game to return to a "game center", completes a level, or performs another other like triggering event.

The content presentation device 110 can be communicationally coupled with a network 199, through which the content presentation device 110 can obtain content to display to the users 130, including the aforementioned primary and auxiliary content. For example, with regards to auxiliary content, an auxiliary content service that provides such auxiliary content, such as an advertising service, can be communicationally coupled to the network 199. The advertising service can include one or more advertising service computing devices, such as the exemplary auxiliary content server computing device 190 shown in FIG. 1. According to one aspect, the advertising service can receive auxiliary content from sources of auxiliary content, such as advertisers, can select specific auxiliary content to be shown to, for example, the users 130 of the content presentation device 110, and can communicate such auxiliary content to the content presentation device 110. For purposes of illustration, the exemplary system 100 of FIG. 1 comprises an exemplary source of auxiliary content, namely the exemplary auxiliary content source 150. The advertising service executing on the auxiliary content server computing device 190 can select advertisements and other auxiliary content to be displayed by the content presentation device 110, on the physical display device 120, as part of the presentation of advertising-supported content, or other primary content. Advertisements are often selected, by an advertising service, based upon information regarding the audience to which such advertisements will be presented. For example, advertisements can be selected based upon the type of primary content with which they will be presented, such that content directed towards older viewers can receive advertisements for, for example, car insurance, while content directed toward younger viewers can receive advertisements for, for example, fast food.

Advertisements can also be selected based upon more specific information regarding the particular users to whom such content is to be displayed. For example, advertisements sent to the content presentation device 110 can be selected based upon information regarding one or more of the users 130. More specifically, users, such as the users 130, can be invited to provide, or allow access to, certain personal information that can aid in the tailoring of the advertisements presented to such users. To protect users' privacy, users would be required to take one or more affirmative actions before their personal information could be collected, and, in the absence of such affirmative action, their personal information would not be collected. From the users' perspective, there can be meaningful benefits to allowing access to some discrete portion of their personal information. For example, such users may allow access to personal information simply because they desire more applicable advertising. As another example, users can be provided with additional services, or benefits, in exchange for providing, or allowing access to, some of their personal information. As yet another example, users can be compensated, either monetarily or through products and services, in exchange for providing, or allowing access to, some of their personal information.

According to one aspect, the content presentation device 110 can have executing thereon a content presentation application 185 that can include computer-executable instructions which, when executed by at least some of the processing units of the content presentation device 110, can cause the content presentation device 110 to perform the steps described in the disclosed mechanisms. One such step can comprise the display of primary content on the physical display device 120, thereby causing the physical display device 120 to physically render images comprising such primary content. As such, the content presentation application 185 can be a video player application, a web browser, a video game, or other content presentation application.

In operation, the auxiliary content server 190 can receive various ones of auxiliary content 161. The auxiliary content 161 can be different from the primary content and the auxiliary content server 190 can select different ones of the auxiliary content 161 to be displayed to the users 130 via the physical display device 120, such as based on the aforementioned user information. More specifically, the auxiliary content server 190 can receive auxiliary content from an auxiliary content source, such as the exemplary auxiliary content source 150, which can be an advertiser, an advertising agency, a weather service, a news service, or other auxiliary content source. The auxiliary content server 190 can also receive, from the auxiliary content source 150, auxiliary content metadata 162 that can be associated with the provided auxiliary content 161. As will be described in further detail below, the auxiliary content metadata 162 can specify adjustability of the auxiliary content 161 based on user interest in the auxiliary content 161. The auxiliary content metadata 162 can be received with, or separate from, the auxiliary content 161.

The auxiliary content server 190 can generate content pod metadata 193 that can specify a structure of a content pod. As utilized herein, the term "pod" or "content pod" means a collection of two or more separate pieces of content whose duration, in the aggregate, is fixed. The content pod metadata 193 can specify the predefined duration of the content pod, during which the auxiliary content 161 can be displayed within a break from the primary content for the predetermined duration. The content pod metadata 193 can also specify a plurality of subdivision time slots of the content pod, where each time slot can be for different auxiliary content. The content pod metadata 193 can additionally specify rules for adjusting or modifying the auxiliary content 161 that is displayed, including based on determined user interest in the auxiliary content 161. The auxiliary content server 190, upon generating the content pod metadata 193, can then transmit the content pod metadata 193 and the auxiliary content 161 over the network 199 to the content presentation device 110. The content pod metadata 193 and the auxiliary content 161 can be transmitted in an auxiliary content package 191 or can be transmitted separately.

For example, once an advertising service, such as one executing, at least in part, on the auxiliary content server computing device 190, selects advertisements to be displayed by the content presentation application 185, such an advertising service can generate an advertisement package, such as the auxiliary content package 191, and can provide it to the content presentation application 185, such as through network communications via the network 199. According to one aspect, the auxiliary content package 191 can include auxiliary content 161 itself, such as the advertisements themselves, as well as pod metadata 193, which can be advertisement metadata. Such pod metadata 193, included with the auxiliary content 161, can comprise information specifying the types of interactivity that can be enabled or utilized with the auxiliary content 161, information associated with the pricing of the auxiliary content 161, information regarding historical or previous user engagement with the type of the auxiliary content 161, as well as other like information about the auxiliary content 161.

The content presentation device 110 can display, to the users 130, primary content on the physical display device 120. The content presentation device 110 can further receive the content pod metadata 193, as well as the auxiliary content 161 and can also display the auxiliary content 161 on the physical display device 120 within a time slot of a content pod, such as during a break from the primary content. For example, once the content presentation application 185 receives the auxiliary content package 191, such as from the auxiliary content server computing device 190, the content presentation application 185 can display at least some of the auxiliary content 161 to the users 130, namely via the display device 120. As indicated previously, and as will be described in further detail below, such a display of auxiliary content can occur at an appropriate time, such as during an ad break in the primary content that is being presented by the content presentation application 185.

To increase user interaction performance, and deliver more engaging auxiliary content, such as more engaging advertisements, which, for the reasons enumerated above, can be desirable to advertisers, the content presentation device 110 can receive, or otherwise obtain, user input while displaying the auxiliary content 161 on the physical display device 120, where such user input can be indicative of user interest in the specific auxiliary content 161 that is being displayed. The content presentation device 110 can then dynamically select and adjust which of the auxiliary content 161 is subsequently displayed to the users 130 based on determined user interest in the auxiliary content 161 that was previously displayed. More specifically, auxiliary content 161, such as an ad, can be expanded or contracted in duration based on detected user interest. Expansions in duration can include both the presentation of additional portions of a specific auxiliary content, as well as the presentation of related, or continuing, auxiliary content immediately after a prior related auxiliary content within a single auxiliary content pod, such as an advertising pod. To take advantage of the mechanisms described herein, and, thereby, provide more engaging advertisements, advertisers can provide multiple ads of different lengths that can each be associated with a particular campaign. For example, a car maker can provide three ads, including a 30 second ad, a one minute ad, and a two minute ad. Initially, a 30 second ad can be shown, and user input indicative of user interest can be utilized to determine whether to display an unrelated ad upon completion of the 30 second ad, or, alternatively, whether to expand the 30 second ad, such as by continuing to display the subsequent 30 seconds of the one minute ad, or displaying the one minute ad immediately subsequently to the 30 second ad.

Figure 2:
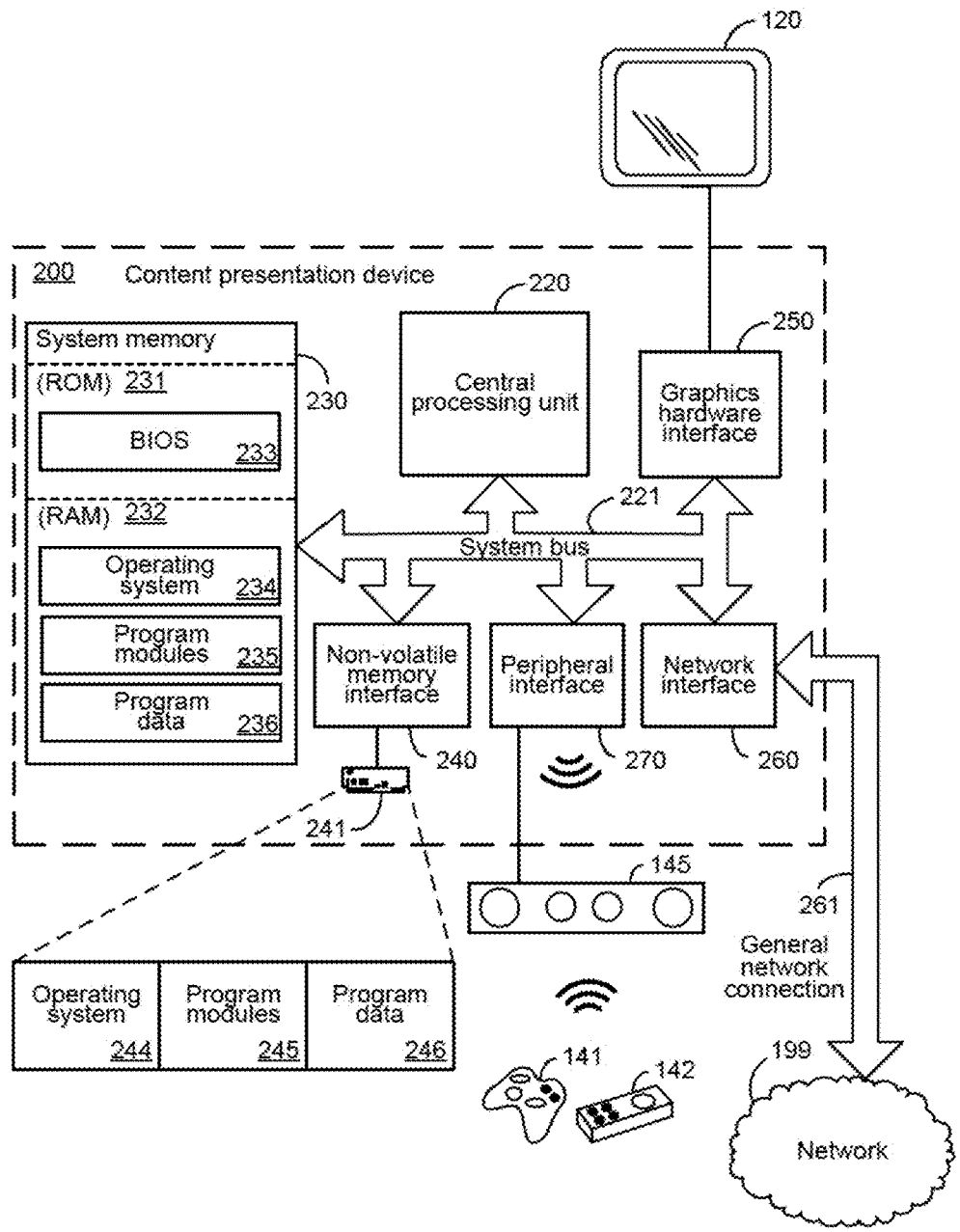
FIG. 2 is a block diagram of an exemplary content presentation device.

Before proceeding with further descriptions of the aforementioned mechanisms, reference is made to FIG. 2, wherein an exemplary content presentation device 200 is illustrated, which can perform some or all of the mechanisms described herein. The exemplary content presentation device 200 can include, but is not limited to, one or more Central Processing Units (CPUs) 220, a system memory 230, and a system bus 221 that couples various system components including the system memory to the processing unit 220. The one or more CPUs 220 can execute computer-executable instructions. The system bus 221 may be any of several types of bus structures including a memory bus or memory controller, a peripheral bus, and a local bus using any of a variety of bus architectures. The content presentation device 200 can include graphics hardware, including, but not limited to, a graphics hardware interface 250 and the display device 120, described previously. For example, the graphics hardware interface 250 can communicationally couple the content presentation device 200 to the physical display device 120 such that the computer-executable instructions being executed by the one or more CPUs 220 cause physical changes to the physical display device 120, thereby generating display content on the physical display device 120.

Depending on the specific physical implementation, one or more of the CPUs 220, the system memory 230 and other components of the content presentation device 200 can be physically co-located, such as on a single chip. In such a case, some or all of the system bus 221 can be nothing more than silicon pathways within a single chip structure and its illustration in FIG. 2 can be nothing more than notational convenience for the purpose of illustration.

The content presentation device 200 also typically includes computer readable media, which can include any available media that can be accessed by content presentation device 200 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the content presentation device 200. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, Radio Frequency (RF), infrared and other wireless media. Combinations of the any of the above should also be included within the scope of computer readable media.

The system memory 230 includes computer storage media in the form of volatile and/or nonvolatile memory such as Read Only Memory (ROM) 231 and Random Access Memory (RAM) 232. A Basic Input/Output System 233 (BIOS), containing the basic routines that help to transfer information between elements within content presentation device 200, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, other program modules 235, and program data 236.

The content presentation device 200 may also include other removable/non-removable, volatile/nonvolatile computer storage media. By way of example only, FIG. 2 illustrates a hard disk drive 241 that reads from or writes to non-removable, non-volatile magnetic media. Other removable/non-removable, volatile/nonvolatile computer storage media that can be used with the exemplary content presentation device include, but are not limited to, magnetic tape cassettes, flash memory cards, digital versatile disks, digital video tape, solid state RAM, solid state ROM, and the like. The hard disk drive 241 is typically connected to the system bus 221 through a non-volatile memory interface such as interface 240.

The drives and their associated computer storage media discussed above and illustrated in FIG. 2, provide storage of computer readable instructions, data structures, program modules and other data for the content presentation device 200. In FIG. 2, for example, hard disk drive 241 is illustrated as storing operating system 244, other program modules 245, and program data 246. Note that these components can either be the same as or different from operating system 234, other program modules 235 and program data 236. Operating system 244, other program modules 245 and program data 246 are given different numbers hereto illustrate that, at a minimum, they are different copies.

The content presentation device 200 may operate in a networked environment using logical connections to one or more remote computers. The content presentation device 200 is illustrated as being connected to the general network connection 261 through a network interface or adapter 260, which is, in turn, connected to the system bus 221. In a networked environment, program modules depicted relative to the content presentation device 200, or portions or peripherals thereof, may be stored in the memory of one or more computing devices that are communicatively coupled to the content presentation device 200 through the general network connection 261. For example, at least some of the program models 245 and program data 246 can be stored on computer-readable storage media remote from the content presentation device 200 and accessible by the content presentation device 200 over the network 199 via the general network connection 261 shown in FIG. 2. In such an instance, the relevant portions of the program modules 245 and/or program data 246 can be streamed or otherwise communicated in real-time or in pseudo-real-time to the content presentation device 200 to be executed and/or utilized thereby in the same manner as if such program modules 245 and/or program data 246 were stored on a local storage device of the content presentation device 200, such as, for example, the hard disk drive 241. It will be appreciated that the network connections shown are exemplary and other means of establishing a communications link between computing devices may be used.

Additionally, the content presentation device 200 can also include, or communicate with, user interface and input peripherals, including, but not limited to the game controller 141, the remote control 142 and the audio/video input device 145 that were described previously with reference to FIG. 1. Other types of input peripherals can equally be utilized, including more traditional computing device input peripherals, such as a keyboard, a trackpad, or a mouse. The display 120 can, itself, be an input peripheral capable of receiving touch-based user input, such as a touch-sensitive, or multi-touch capable, display device. Such input peripherals can be communicationally coupled to the system bus 121 via a peripheral interface 270. Such communicational couplings can be wired, as exemplarily illustrated in FIG. 2 with the wired connection between the peripheral interface 270 and the audio/video input device 145, or they can be wireless, as exemplarily illustrated in FIG. 2 with the wireless connection between the peripheral interface 270 and the game controller 141 and the remote control 142.

Although described as a single physical device, the exemplary content presentation device 200 can be a virtual content presentation device, in which case the functionality of the above-described physical components, such as the CPU 220, the system memory 230, the network interface 260, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary content presentation device 200 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "content presentation device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

Figure 3:
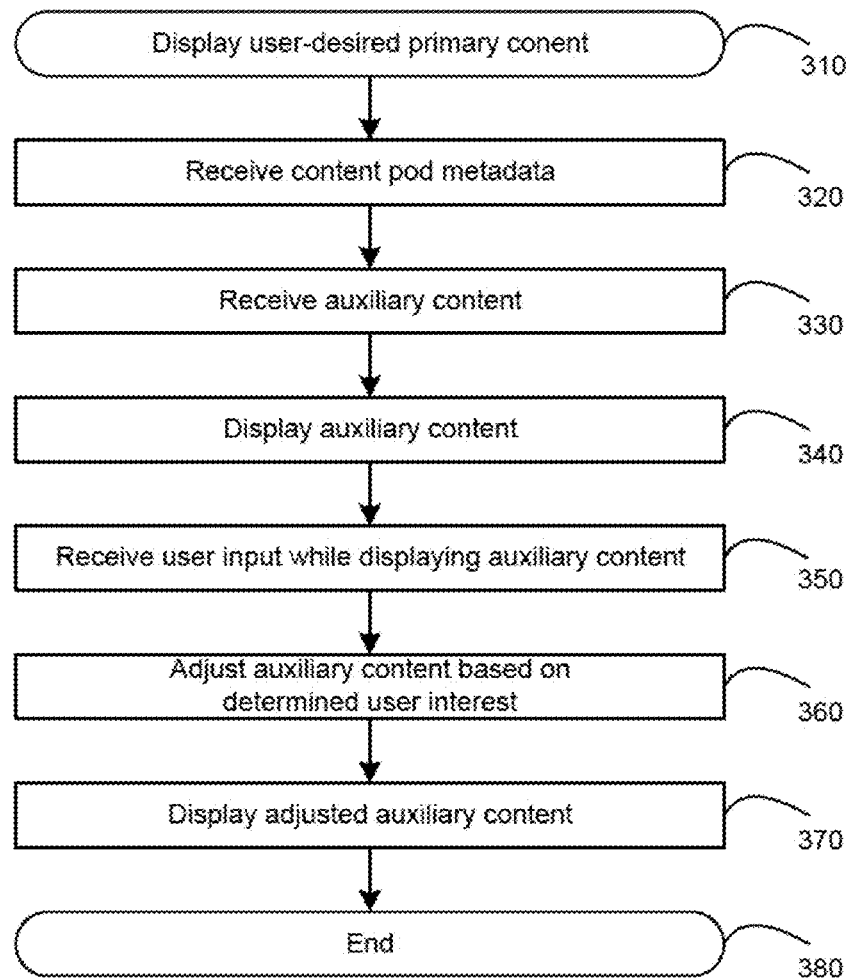
FIG. 3 is an exemplary flow diagram illustrating operation of a content presentation device for increasing user interaction performance.

Turning to FIG. 3, an exemplary flow diagram 300 is shown therein, illustrating an exemplary operation of the content presentation device 200 for increasing user efficiency and interaction performance by presenting more engaging auxiliary content during breaks in the primary, user-desired content. Initially, at step 310, user-desired primary content can be displayed to one or more users on a physical display device that is communicationally coupled to the content presentation device 200. At step 320, content pod metadata can be received. The content pod metadata can be received before displaying the primary content, while displaying the primary content, or during a break in the primary content and, as such, its illustration as a subsequent step to step 310 is merely by way of exemplary illustration and is not intended to indicate that step 310 is a precondition to the performance of step 320.

The content pod metadata, received at step 320, can specify a predefined duration of a content pod within which auxiliary content, different from primary content, can be displayed to users, such as during a break or interruption in the display of the primary content. The content pod metadata can also specify a plurality of subdivision time slots of the content pod, where each time slot can be for independent auxiliary content that can be selected and presented, within each time slot, independently of other auxiliary content selected and presented within other time slots. The subdivision time slots may be of equal length or different lengths. For example, the content pod may have a duration of two minutes, and that duration can be specified, by the content pod metadata, as being divided into four subdivision time slots of 30 seconds each, two 30 second time slots and one 60 second time slot, two 60 second time slots, or other like combinations of subdivision time slots.

At step 330, auxiliary content can be received. The auxiliary content may be different from the primary content, but may or may not still be related to the primary content in that it may or may not reference the primary content. Receiving auxiliary content, such as at step 330, can also include receiving auxiliary content metadata that can identify associations between auxiliary content. For example, an association can be for one 30 second auxiliary content and can identify a second 30 second auxiliary content that is associated with the first 30 second auxiliary content, where the second 30 second auxiliary content can be displayed after the first 30 second auxiliary content, superseding a different 30 second auxiliary content, if a user indicates an interest in the first 30 second auxiliary content.

The received auxiliary content can include first auxiliary content to display on the physical display device during a first time slot of the content pod, where the first auxiliary content can have a first length. The received auxiliary content can also include second auxiliary content to display on the physical display device during a second time slot of the content pod, where the second auxiliary content can differ from the user-desired primary content and can also differ from the first auxiliary content, and where the second auxiliary content can have a second length. The first length and the second length can be equal or different lengths. Also, the terms "first" and "second" are used to differentiate different elements and, unless otherwise indicated as first and second in a series of elements, do not necessarily mean a particular location or a particular order of elements within a plurality of elements.

The second auxiliary content may be related to the first auxiliary content and may not necessarily be pre-assigned a particular time slot in the auxiliary content pod. Alternatively, the second auxiliary content may be unrelated to the first auxiliary content and may be assigned to a subsequent time slot immediately subsequent to the first time slot or can be assigned to a different time slot in the auxiliary content pod. The first and second auxiliary content may further be any combination of related, unrelated, time slot assigned, and time slot unassigned. The second auxiliary content may be different from the first auxiliary content, but may still be related to the second auxiliary content in that it may be within the same genre as the first auxiliary content. Alternately, the second auxiliary content may be different from the first auxiliary content by being unrelated to the first auxiliary content.

The auxiliary content can be advertising content displayed during an advertising break from the primary content. Alternatively, or in addition, the auxiliary content may be information content and the content pod can be a defined interruption in the presentation of primary content, such as an information break, an advertising break, a news service break, a weather service break, a sports update break, or other break from the primary content to display the auxiliary content.

At least some of the above aspects can provide for a scenario where a user is consuming primary content through a set top box, a gaming console, a tablet, a personal computer, a laptop computer or other the content presentation device. The primary content can be on-demand content, live television content, game content, streaming movie content, or other primary content. The auxiliary content can be programmed advertising content, advertising content that supersedes network advertising content, weather report content, sports report content, news report content, informative content, or other auxiliary content.

As indicated previously, the received auxiliary content can include auxiliary content metadata. As also indicated previously, auxiliary content metadata can include information linking some auxiliary content to additional auxiliary content. For example, the auxiliary content metadata can link a specific auxiliary content to one or more expanded versions of that auxiliary content. As another example, the auxiliary content metadata can link a specific auxiliary content to related auxiliary content in related genera, or to related auxiliary content that is to be inserted into the ad pod after the original auxiliary content if the user interest indicates the user is interested in the original auxiliary content.

At 340, the auxiliary content can be displayed on the physical display device within a time slot of the content pod. Displaying the auxiliary content can include displaying a specific auxiliary content on the physical display device within the first time slot of the content pod during a break from the primary content.

At 350, user input can be received while displaying the auxiliary content on the physical display device. The user input, received at step 350, can be indicative of user interest in the auxiliary content that is being displayed, as indicated at step 340. According to one aspect, the received user input can indicate user interest in the first auxiliary content. The received user input can include implicit user input that is received while displaying the auxiliary content on the physical display device, where the implicit user input can be passive input from the user indicating user interest in the auxiliary content. For example, implicit user input can include facial or eye recognition to determine if the user is watching the auxiliary content. Implicit user input can also include presence detection to determine whether a user has left the room or viewing area, to determine a number of users present or absent from a room and other like information. As a further example, presence detection can include optical detection, such as using a camera, using audible detection, using a microphone, using an audio/visual input device, such as a line of motion sensing input device, using proximity detection, using near field communication with user devices, using a biometric sensor, using relationships between personal computer windows, and using other presence detection. According to one implementation, a camera, such as on a set-top box, on an audio/visual input device, on a webcam, on a smartphone, on a tablet, or any other camera, can detect whether a user is actually viewing the auxiliary content as user input to determine the user interest in the content. As another example, a microphone or biometric sensor can determine whether users have remained or left a room while the auxiliary content is playing to determine their interest. As a further example, an application on a computer can determine whether a user has switched to a different window from the window playing the auxiliary content or switched to another application from the application playing the auxiliary content to determine the user interest.

Aspects can also provide for receiving explicit input that involves active direct input from the user that indicates a desire to receive more information or continue playing particular auxiliary content. The active direct input can include pressing a button, touching an icon on a touch screen, speaking a command, or any other direct interactive input that indicates a desire to receive more information or to continue playing a longer version of the auxiliary content. According to a possible implementation, the content presentation device can present the user with an on-screen option, such as dynamic overlay, to prompt the user for explicit input to continue watching for more information.

By way of a specific example, for advertising content, a user can be watching a 30 second advertisement and the content presentation device 110 can detect that the user is engaged, such as by using real-time camera, biometric, or other implicit user inputs. For example, an ad break control algorithm executing on the content presentation device 110 can take into account prior behavioral data that shows whether a user has a propensity to engage with the particular advertiser, the particular genre, or other like historical engagement factors. Additionally, or alternatively, the ad break control algorithm can extrapolate user engagement based upon user behavior that is typically or historically indicative of engagement, such as can be obtained through real-time camera, biometric, or other implicit user inputs. Therefore an ad system for the content presentation device can predict or determine in real-time whether the user will have, or is currently expressing, interest in the advertisement being presented.

Alternatively, or in addition, the content presentation device 110 can detect that the user is engaged through explicit user inputs. For example, the content presentation device can present the user with an on-screen option, such as dynamic overlay, by which the user can provide an explicit input indicating their interest in the advertising content and explicitly request more information, such as via a remote, controller, voice, gesture, or otherwise. The content presentation device 110 can further detect that there are either longer versions of the same advertisement available, or that there are otherwise related additional advertisements available. Utilizing such related advertisements, the content presentation device 110 can expand the advertisement in real time to either display a longer duration version of the same advertisement or to display subsequent, related advertisement that can, for example, continue a story started with the initial advertisement. Depending on the length of the ad, instead of having to watch subsequent advertisements after the extended advertisement concludes, the user can then be returned to the primary content the user had been watching.

In both explicit and implicit user input cases, subsequent related ads or longer versions of a particular ad can be priced at a premium, such as higher cost per minute, than the traditional 30 second ads, causing the advertiser to pay more to have such advertisements presented to users. Alternately, if the user input indicates the user is not interested in a particular ad, the ad can be shortened and the advertiser can be provided with a discount.

At step 360, the auxiliary content can be adjusted based on the user interest that is determined from the user input received at step 350. More specifically, and as indicated previously, the duration of the auxiliary content can be adjusted based on the determined user interest in the auxiliary content. The auxiliary content can be adjusted by expanding the auxiliary content, by contracting the auxiliary content, by adding additional auxiliary content, by adding related auxiliary content, or by otherwise adjusting the auxiliary content. For example, the auxiliary content that is being presented can be adjusted by selecting a second auxiliary content to be displayed during an immediately subsequent time slot, where the second auxiliary content is related to the first auxiliary content and may have not been previously assigned a particular time slot in the auxiliary content pod. As another example, the auxiliary content that is being presented can be adjusted by removing a second auxiliary content from the subsequent time slot to accommodate expansion of the first auxiliary content where the second auxiliary content that was removed is unrelated to the first auxiliary content. As another example, adjusting the auxiliary content can include contracting the auxiliary content that is being shown and adding a second auxiliary content to a subsequent time slot that resulted from, or "opened up" from, the contraction of the prior auxiliary content.

As indicated, adjusting the duration of the auxiliary content can include lengthening or shortening the length of time that the auxiliary content is displayed to users and can include other adjustments to the auxiliary content. For example, if the user interest indicates the user is not interested in the auxiliary content, the auxiliary content can be contracted in time, such as by cutting it from 60 to 30 seconds, from 30 to 15 seconds, or otherwise contracting the auxiliary content. The resulting newly available time in the ad pod can then be filled with other auxiliary content. Therefore, the presentation of auxiliary content to a user, such as information and advertisements, can be dynamically adjusted to include greater or fewer quantity of ads based on user initiation, behavioral actions, or real-time captured biometric data. Similarly, the duration of individual content can be adjusted to be of greater duration, or shorter duration, than originally intended.

By way of a specific example, the duration of a specific auxiliary content can take up two subdivision time slots. If the user input, such as that received at step 350, indicates a lack of user interest during the presentation of the specific auxiliary content in the first time slot, the auxiliary content can be reduced to only one time slot, namely that first time slot, and other, different auxiliary content can be inserted into the now empty subsequent time slot. Alternately, if the user interest indicates the user is interested in the auxiliary content, the auxiliary content can be expanded in time duration. As a further example, if the user interest indicates the user is interested in the auxiliary content, the auxiliary content can be expanded to take over an entire ad pod or at least the entire remaining length of the ad pod. Furthermore, the auxiliary content can be expanded to take over only one or more than one subsequent subdivision time slots. If the auxiliary content is expanded, other auxiliary content that was intended for next subdivision time slot(s) can be removed. In such a case, the number of different auxiliary content in a single, specific auxiliary content pod can be reduced if one or more of the auxiliary content is extended based on the user interest.

Adjusting the auxiliary content can also include simply replacing the first content pod with a second, different content pod. For example, an original content pod schedule can be modified, or a replacement content pod schedule can be selected from between different schedules depending on whether the auxiliary content is adjusted based on user interest. Subsequently, at 370, the auxiliary content can be displayed on the physical display device. At 380, the flow diagram 300 can end.

Figure 4:
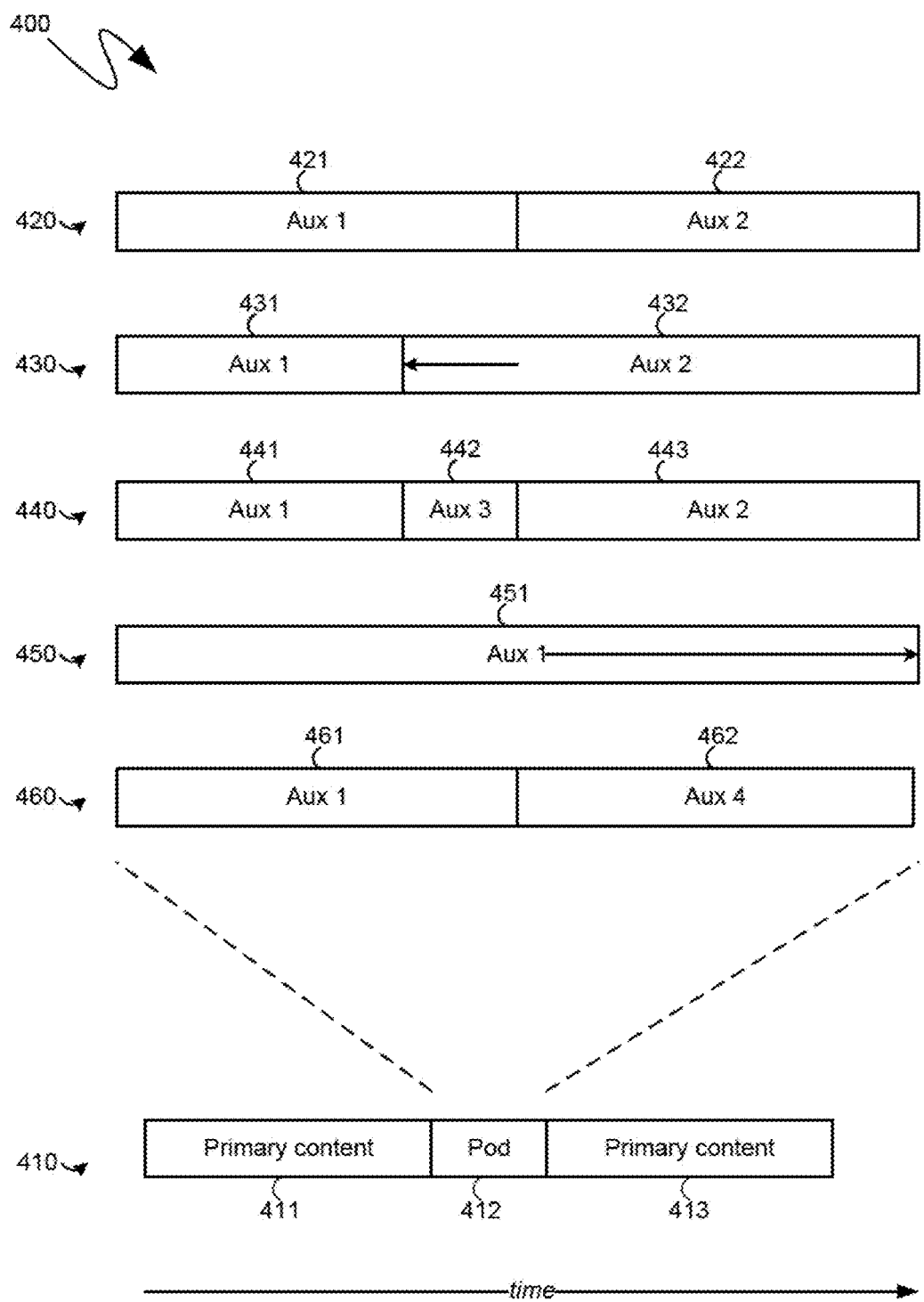
FIG. 4 is an exemplary timeline illustration of a content pod with content that is dynamically adjustable in duration.

Turning to FIG. 4, the system 400 shown therein illustrates an exemplary timeline illustration of various dynamic modifications to the duration of auxiliary content. More specifically, the exemplary content presentation timeline 410 comprises an auxiliary content pod 412 presented to users during a break from primary content. As such, the auxiliary content pod 412 is illustrated in FIG. 4 as occurring subsequent in time to a first section of primary content 411 and prior in time to a second section of primary content 413, which can be a continuation of the primary content 411, or can be different primary content. For example, a television program can run for a set duration until there is a break in the television program for auxiliary content, such as advertisements, news updates, and other auxiliary content. The content pod 412 can delineate the duration for the break and subdivide the duration into time slots for different auxiliary content. After the display of the auxiliary content delineated by the content pod 412 has completed, a second section of the primary content 413 can be displayed.

Also illustrated by the exemplary system 400 of FIG. 4 are various alternative pod divisions 420, 430, 440, 450, and 460 that illustrate adjustments of the duration of the auxiliary content shown as part of the pod 412. In example 420, the pod 412 can be divided into a first time slot 421 and second time slot 422. If user input is indicative of the user not being interested in the auxiliary content being presented within the first time slot 421, the duration of presentation of such auxiliary content can be contracted and, as one example, the duration of a subsequent time slot, namely the second time slot 422 can be expanded to fill the resulting gap. Example 430 illustrates a shorter time slot 431, which can represent the shortened presentation of auxiliary content within the first time slot 421, and an extended duration time slot 432, which can represent the extension of the second time slot 422. As an alternative, in example 440, a new time slot 442 can be inserted into the resulting gap if the auxiliary content shown during the time slot 421 is contracted, as represented by the contracted time slot 441 in example 440, due to a determined lack of user interest in the auxiliary content being presented. Time slot 443 can, therefore, represent the same time slot as time slot 422 in example 420.

In example 450, if user input is received that is indicative of the user being interested in the auxiliary content being shown during the time slot 421, the time slot 421 can be expanded, as illustrated by the expanded time slot 451 of the example 450. In such an instance, the time slot 422 can be shortened, or even simply removed, as illustrated by the example 450. The auxiliary content being shown during the time slot 421 can also be expanded by selecting additional or related auxiliary content and replacing whatever auxiliary content was going to be shown in the time slot 422 with the additional or related auxiliary content. Such replacing can be done "on-the-fly". Example 460, therefore, indicates a time slot 462 that can be equivalent in duration to the time slot 422, but can comprise different auxiliary content, namely auxiliary content that is additive to the auxiliary content shown during the time slot 461, or auxiliary content that is related to, or in the same genre as, the auxiliary content shown during the time slot 461. The examples 420, 430, 440, 450 and 460 are only some possible examples and many other variations of adjustment of auxiliary content are possible.

Figure 5:
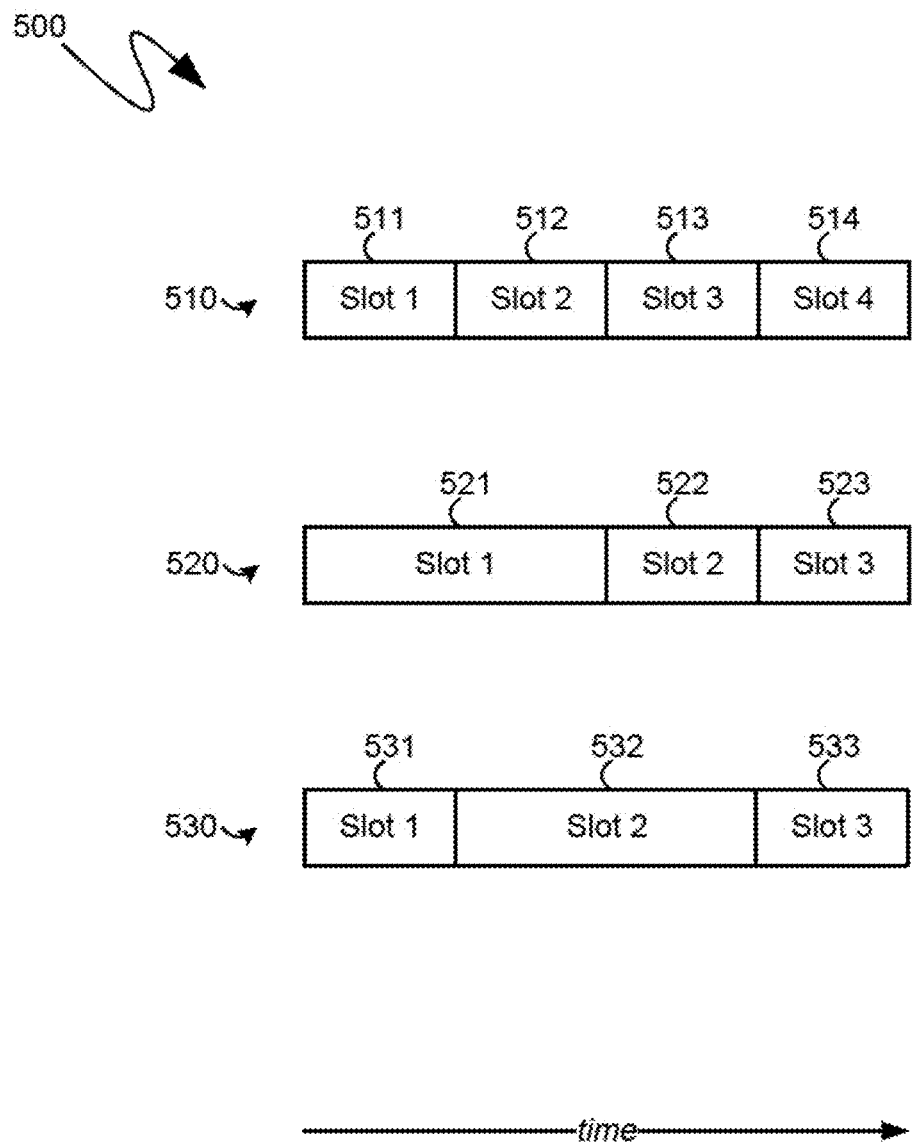
FIG. 5 is another exemplary timeline illustration of alternative content pods with different subdivision time slots.

Turning to FIG. 5, the exemplary system 500 shown therein illustrates three alternative examples of content pod schedules, namely the examples 510, 520, and 530 with different subdivision time slots. The first content pod schedule 510 can include four time slots 511-514 of equal duration, such as of 30 seconds each. The second content pod schedule 520 can include a first time slot 521 of a first duration, such as 60 seconds, and two subsequent time slots 522 and 523 of shorter equal lengths, such as 30 seconds each. The third content pod schedule 530 can include a first time slot 531 of a first duration, such as 30 seconds, a second time slot 532 of a second duration, such as 60 seconds, and a third time slot 533 of the first duration of 30 seconds.

Different content pod schedules can be sent from the auxiliary content server computing device 190 (shown in FIG. 1) to the content pod presentation device 110 (also shown in FIG. 1) depending on the duration of the auxiliary content that is associated with such content pod schedules. For example, if four equal sections of different auxiliary content are each 30 seconds long, the first content pod schedule 510 can be utilized. Additional content pod schedules 520 can 530 can also be provided, such as from an advertising service, together with both the selected auxiliary content that is to be displayed and with different permutations of the auxiliary content. Then, if user input is indicative of user interest, or lack thereof, in certain auxiliary content, the duration of that content can be adjusted and a different content pod schedule can be selected, such as by the content pod presentation device 100 (shown in FIG. 1), to accommodate the adjustment. For example, if user input indicates user interest in auxiliary content that is displayed during the first time slot 511, the second content pod schedule 520 can be dynamically selected, such as during the presentation of the auxiliary content during the first time slot 511, to accommodate expanded auxiliary content in the, now longer, time slot 521. Similarly, as another example, if user input indicates user interest in first auxiliary content in the second time slot 512, the second content pod schedule 530 can be dynamically selected, such as during the presentation of the auxiliary content during the first time slot 511, to accommodate expanded second auxiliary content in the now longer second time slot 532. The content pod schedules 510, 520, and 530 are only examples, and many additional different types of content pod schedules can be used depending on the different permutations of desired time slot lengths. According to different aspects, the content presentation device 110 can modify an original content pod schedule or pick between different schedules when auxiliary content is adjusted based on user interest.

Figure 6:
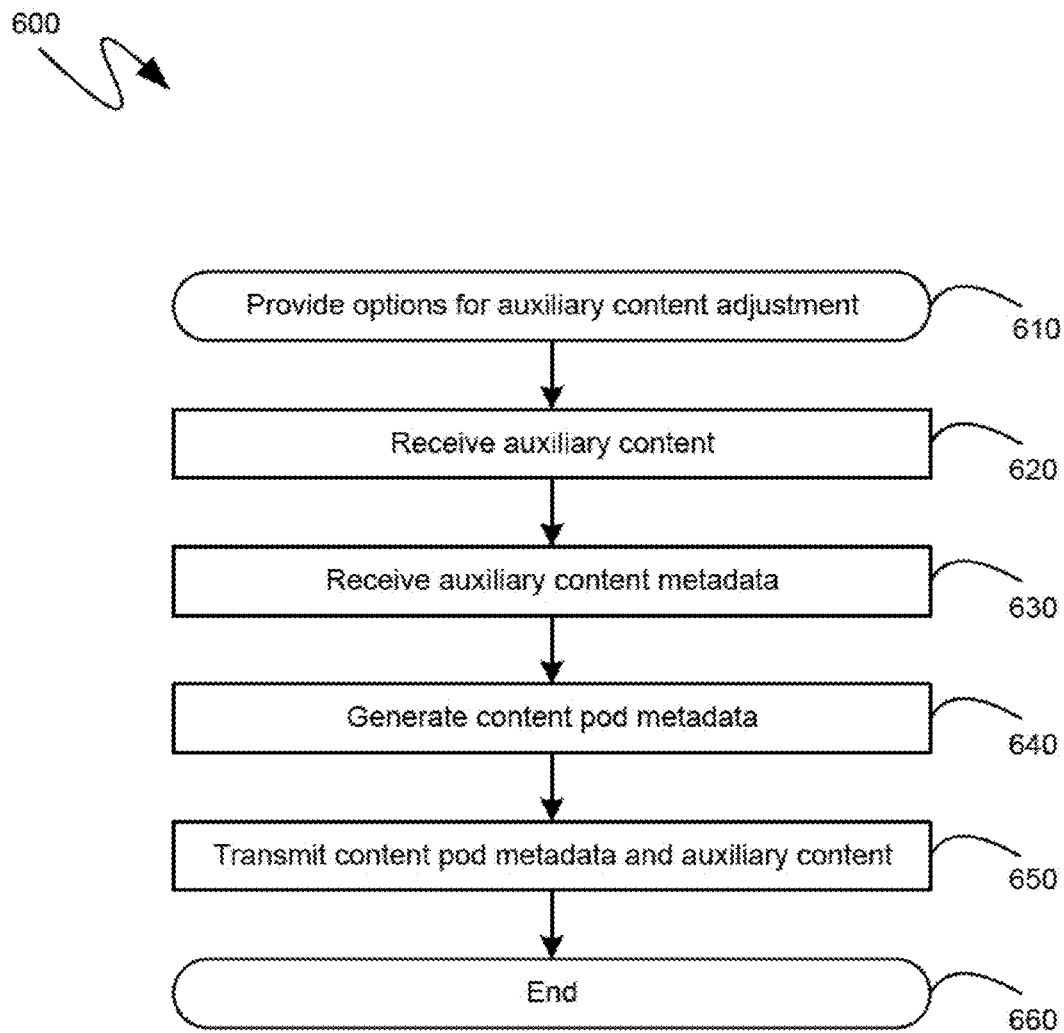
FIG. 6 is an exemplary flow diagram illustrating operation of an auxiliary content server computing device for serving auxiliary content.

Turning to FIG. 6, the exemplary flow diagram 600 shown therein illustrates an exemplary operation of an auxiliary content server computing device for serving auxiliary content. Initially, at step 610, options for different adjustments of auxiliary content can be provided, such as to advertisers or other entities sourcing such auxiliary content, where the adjustment options can be based on user interest in the auxiliary content. For example, auxiliary content providers can be provided with options that allow the purchasing of expansion ads, together with mechanisms by which such expandable auxiliary content is to be provided. As will be recognized by those skilled in the art, longer advertisements, for example, can be more engaging and, therefore, more valuable, especially when their presentation to users in response to user input indicative of user interest in such advertisements. Thus, if an advertiser buys a 30 second ad together with supplemental 30 second ad, the supplemental ad may be displayed in response to determined user interest in the original ad. The resulting 60 second ad, based on determined user interest, can be more valuable than a 60 second ad that is run regardless of user interest in the ad. Thus, the advertiser may be willing to pay more, and can be charged more, when the ad is extended to 60 seconds based on user interest than when an original 60 second ad is displayed regardless of user interest. Alternately, if the user is not interested in an ad, a 60 second ad can be contracted to a 30 second ad, for example, and the advertiser can be charged less, which can provide desirable cost savings to the advertiser. Also, if user input indicative of user interest in a particular genre of ads is received, an ad in a subsequent time slot can be replaced with an ad of the same genre, which can more valuable to the advertiser providing that subsequent ad. Therefore, different prices can be charged for original, expanded, contracted, or supplemental auxiliary content. The content presentation device can report auxiliary content adjustments back to an auxiliary content server device, which can then charge the source of the auxiliary content based on the adjustments made to the auxiliary content.

At step 620, auxiliary content can be received from one or more sources of such auxiliary content, where, again, the auxiliary content that is received is that which can be displayed on a physical display device during a break from whatever primary content is being consumed by the users of a content presentation device that is communicationally coupled to such a physical display device. As indicated, the auxiliary content can be different from the primary content, and the auxiliary content, received at step 620, can be adjustable based on determined user interest in the auxiliary content. The auxiliary content that is received at step 620 can include a first auxiliary content that is to be displayed on a physical display device during a first time slot and can also include second auxiliary content to be displayed on the physical display device during a second time slot of the content pod, where the second auxiliary content can either differ from the first auxiliary content, or can be an extension of, or otherwise associated with, the first auxiliary content, thereby enabling the first auxiliary content to be extended, or contracted, in response to determined user input.

At step 630, auxiliary content metadata can be received, which can specify the adjustability of the auxiliary content received at step 620. For example, the auxiliary content metadata, received at step 630, can define options for different adjustments of auxiliary content based on determined user interest in the auxiliary content. The auxiliary content and the auxiliary content metadata can be received from a source of the auxiliary content, such as an advertiser, a weather service, a sports update service, a news service, or any other source of auxiliary content. Alternatively, the auxiliary content metadata can be internally generated, such as by the advertising service, based upon relevant information regarding the adjustability of auxiliary content, where such relevant information can be what is received at step 630.

Subsequently, at step 640, content pod metadata can be generated. The content pod metadata can specify a structure of a content pod, can specify a predefined duration of the content pod for displaying the auxiliary content within a break from the primary content, can specify a plurality of subdivision time slots of the content pod, where each time slot can be for different auxiliary content, and/or can specify auxiliary content adjustments for adjusting the auxiliary content based on determined user interest in the auxiliary content. For example, the generated content pod metadata can specify rules for contracting auxiliary content, replacing auxiliary content with other auxiliary content, moving auxiliary content to an alternative time slot or pod, and following auxiliary content with related auxiliary content within the context of the content pod.

More specifically, the duration of the content pod can be defined in the content pod metadata at the auxiliary content server before it is sent to the content presentation device. Such content pod metadata may defined immutable, or fixed, timings reflective of boundary conditions. For example, a television show may have 22 minutes of primary content with 30 minutes allocated to the show. This can result in 6 minutes of auxiliary content including four content pods of two minutes each. There may be one 90 second auxiliary content and one 30 second auxiliary content allocated to a given two minute content pod. The 90 second content can be run in the first 90 seconds or in the last 90 seconds. The 90 second content can then be contracted if it is in either time spot, but may only be expanded into the remaining 30 seconds if it is in the first spot.

The generated content pod metadata can also specify content pod schedules, where the content pod schedules can define different, or alternative, content pods with different length time slots in different orders. The generated content pod metadata can also specify content pod schedule rules, where the content pod schedule rules can define rules for selecting different content pod schedules with different length and different order time slots based on determined user interest in the auxiliary content. For example, instead of an auxiliary content server serving only auxiliary content and/or a content pod to the content presentation device, the server can alternately serve one or more content pod schedules and corresponding rules. As a further example, a first schedule can have four equal 30 second subdivision time slots for a content pod and a second schedule can have two 30 second and one 60 second subdivision time slots arranged in any given order. Additional schedules can have different length subdivision time slots arranged in different orders. Based on user interest in auxiliary content using the content pod schedule rules, different content pod schedules can be chosen to accommodate expansion or contraction of auxiliary content in the subdivision time slots. This intelligence can be provided by the auxiliary content server device to the content presentation device or can be sourced at the content presentation device itself. The content presentation device can then determine user interest, such as user engagement, in auxiliary content being presented as part of a first schedule and can select a second schedule to accommodate adjustment of the auxiliary content based on the determined user interest.

At step 650, the content pod metadata and the auxiliary content can be transmitted, such as over a network, to a content presentation device. On-screen auxiliary content adjustment options, such as can be presented to a user and which the user can utilize to provide explicit indicia of user interest in auxiliary content being presented, can also be transmitted. The on-screen auxiliary adjustment options can be presented to a user on the physical display, where the on-screen auxiliary content adjustment options can inform the user of options for adjusting the auxiliary content. For example, the on-screen auxiliary content adjustment options can provide options for expanding or contracting auxiliary content while the auxiliary content is displayed on the physical display. As a more specific example, within the context of advertising content, a user can be watching a 30 second advertisement and the content presentation device can detect both that the user is engaged, such as based user interest using real time camera, biometric, or other data, and can also detect that there are other longer or different versions of the ad for that particular ad campaign. The content presentation device can present the user with an on-screen option, such as dynamic overlay, to continue watching for more information. Alternatively, as indicated previously, the content presentation device can automatically select such longer or different versions of the advertisement based upon the user interest as determined by the implicit user input, such as that obtained through a camera or other like input device. At step 660, the flow diagram 600 can end.

The descriptions above include, as a first example, content presentation device for increasing user efficiency and interaction performance while consuming content, the content presentation device comprising: one or more processing units that execute computer-executable instructions; a graphics hardware interface communicationally coupling the content presentation device to a physical display device such that the computer-executable instructions being executed by the one or more processing units cause physical changes to the physical display device, thereby generating display content on the physical display device; a content presentation application comprising computer-executable instructions which, when executed by at least some of the one or more processing units, cause the content presentation device to perform steps comprising: displaying, to a user, user-desired primary content on the physical display device; receiving content pod metadata specifying a predefined duration of a content pod for displaying auxiliary content, different from primary content, during a break from the primary content, the content pod metadata also specifying a plurality of subdivision time slots of the content pod; receiving a first auxiliary content to display on the physical display device during a first time slot of the content pod, the first auxiliary content differing from the user-desired primary content; displaying the first auxiliary content on the physical display device within the first time slot of the content pod; receiving user input while displaying the first auxiliary content on the physical display device, the user input indicative of a user interest in the first auxiliary content; adjusting a duration of the first auxiliary content based on the user interest; and displaying the adjusted duration first auxiliary content.

A second example is the content presentation device of the first example, wherein the adjusting the duration of the first auxiliary content comprises either increasing the duration of the first auxiliary content and correspondingly increasing the first time slot or decreasing the duration of the first auxiliary content and correspondingly decreasing the first time slot.

A third example is the content presentation device of the first example, wherein the content presentation application comprises further computer-executable instructions which, when executed by the one or more processing units, cause the content presentation device to receive a second auxiliary content to display on the physical display device during a second time slot of the content pod occurring immediately subsequent to the first time slot, the second auxiliary content differing from the user-desired primary content and also differing from the first auxiliary content; and wherein further the adjusting the duration of the first auxiliary content comprises extending the first auxiliary content into the second time slot and selecting to not display the second auxiliary content during the second time slot.

A fourth example is the content presentation device of the first example, wherein the content presentation application comprises further computer-executable instructions which, when executed by the one or more processing units, cause the content presentation device to receive a second auxiliary content that is related to the first auxiliary content and is not assigned a specific time slot in the auxiliary content pod; and wherein further the adjusting the duration of the first auxiliary content comprises displaying the second auxiliary content on the physical display device within a second time slot of the content pod occurring immediately subsequent to the first time slot.

A fifth example is the content presentation device of the first example, wherein the content presentation application comprises further computer-executable instructions which, when executed by the one or more processing units, cause the content presentation device to receive a second auxiliary content that is a longer duration version of the first auxiliary content; and wherein further the adjusting the duration of the first auxiliary content comprises displaying a latter portion of the second auxiliary content on the physical display device within a second time slot of the content pod occurring immediately subsequent to the first time slot.

A sixth example is the content presentation device of the first example, wherein the content presentation application comprises further computer-executable instructions which, when executed by the one or more processing units, cause the content presentation device to receive a second auxiliary content to display on the physical display device during a second time slot of the content pod occurring immediately subsequent to the first time slot, the second auxiliary content differing from the user-desired primary content and also differing from the first auxiliary content; and wherein further the adjusting the duration of the first auxiliary content comprises: decreasing the duration of the first auxiliary content; correspondingly decreasing the first time slot, creating a third time slot immediately subsequent to the first time slot and immediately prior to the second time slot, and displaying the second auxiliary content during the created third time slot.

A seventh example is the content presentation device of the first example, wherein the receiving the content pod metadata comprises receiving a first content pod schedule metadata specifying a first plurality of subdivision time slots of the content pod and a second content pod schedule metadata specifying a second, different plurality of subdivision time slots of the content pod; and wherein further the adjusting the duration of the first auxiliary content comprises ceasing displaying of auxiliary content in accordance with the first content pod schedule and commencing displaying auxiliary content in accordance with the second content pod to accommodate the adjusted duration first auxiliary content.

An eighth example is the content presentation device of the first example, wherein the receiving the user input comprises receiving implicit user input while displaying the first auxiliary content on the physical display device.

A ninth example is the content presentation device of the first example, wherein the first auxiliary content comprises an advertisement displayed during an advertising break from the primary content.

A tenth example is the content presentation device of the first example, wherein the received first auxiliary content is associated with a first auxiliary content metadata comprising information linking the first auxiliary content to additional auxiliary content that is related to the first auxiliary content.

A eleventh example is an auxiliary content server that serves auxiliary content, the auxiliary content server comprising: one or more processing units that execute computer-executable instructions; a network interface communicationally coupling the content server to a content presentation device such that the content presentation device causes physical changes to a physical display device coupled to the content presentation device, thereby generating display content on the physical display device; a content pod generation application comprising computer-executable instructions which, when executed by at least some of the one or more processing units, cause the auxiliary content server to perform steps comprising: receiving auxiliary content to be displayed on the physical display device during a break from primary content, the auxiliary content being different from the primary content, the auxiliary content being adjustable in duration based on user interest in the auxiliary content; receiving auxiliary content metadata specifying adjustability in duration of the auxiliary content based on the user interest in the auxiliary content; generating content pod metadata specifying: a predefined duration of a content pod delineating display of the auxiliary content within the break from the primary content; a plurality of subdivision time slots of the content pod, and auxiliary content duration adjustment rules for adjusting a duration of the auxiliary content based on the user interest in the auxiliary content; and transmitting the content pod metadata with the auxiliary content over the network interface to the content presentation device.

A twelfth example is the auxiliary content server of the eleventh example, wherein the transmitted auxiliary content includes both a first auxiliary content to display on the physical display device during a first time slot of the content pod, the first auxiliary content differing from the primary content, and a second auxiliary content to display on the physical display device, the second auxiliary content also differing from the primary content, wherein user interest in the display of the first auxiliary content triggers display of the second auxiliary content on the physical display device immediately subsequent to the first auxiliary content based upon, thereby achieving an extension in duration of the first auxiliary content.

A thirteenth example is the auxiliary content server of the eleventh example, wherein the generated content pod metadata specifies content pod schedules, the content pod schedules defining different content pods with different length time slots in different orders.

A fourteenth example is the auxiliary content server of the thirteenth example, wherein the generated content pod metadata specifies content pod schedule rules, the content pod schedule rules defining rules for selecting different content pod schedules with different length and different order time slots based on the user interest in the auxiliary content.

A fifteenth example is the auxiliary content server of the eleventh example, wherein the auxiliary content duration adjustment rules comprise at least one of: an auxiliary content duration adjustment rule for expanding the duration of the auxiliary content and an auxiliary content duration adjustment rule for contracting the duration of the auxiliary content.

A sixteenth example is the auxiliary content server of the eleventh example, wherein transmitting includes transmitting on-screen auxiliary content duration adjustment options for presentation to a user on the physical display, the on-screen auxiliary content duration adjustment options informing the user of options for adjusting the duration of the auxiliary content.

A seventeenth example is the auxiliary content server of the eleventh example, wherein the auxiliary content comprises advertising content displayed during an advertising break from the primary content.

An eighteenth example is the auxiliary content server of the eleventh example, further comprising an auxiliary content tracking application comprising computer-executable instructions which, when executed by at least some of the one or more processing units, cause the auxiliary content server to perform steps comprising: receiving information from the content presentation device indicative of whether the auxiliary content that was presented was adjusted in duration.

A nineteenth example is a method of increasing user efficiency and interaction performance while consuming content from a content presentation computing device, the method comprising the steps of: receiving, at an auxiliary content server computing device, auxiliary content to be displayed on a physical display device communicationally coupled to the content presentation computing device, the auxiliary content being adjustable in duration based on user interest in the auxiliary content; receiving, at the auxiliary content server computing device, auxiliary content metadata specifying adjustability in duration of the auxiliary content based on the user interest in the auxiliary content; generating, at the auxiliary content server computing device, content pod metadata specifying: a predefined duration of a content pod delineating display of the auxiliary content within the break from a user-desired primary content; a plurality of subdivision time slots of the content pod, and auxiliary content duration adjustment rules for adjusting a duration of the auxiliary content based on the user interest in the auxiliary content; displaying, to a user, the user-desired primary content on the physical display device; receiving, at the content presentation computing device, the content pod metadata; receiving, at the content presentation computing device, a first auxiliary content to display on the physical display device during a first time slot of the content pod, the first auxiliary content differing from the user-desired primary content; displaying the first auxiliary content on the physical display device within the first time slot of the content pod; receiving, at the content presentation computing device, user input while displaying the first auxiliary content on the physical display device, the user input indicative of a user interest in the first auxiliary content; adjusting, at the content presentation computing device, a duration of the first auxiliary content based on the user interest; and displaying the adjusted duration first auxiliary content.

A twentieth example is the method of the nineteenth example, further comprising the steps of: receiving, at the content presentation computing device, a second auxiliary content to display on the physical display device during a second time slot of the content pod occurring immediately subsequent to the first time slot, the second auxiliary content differing from the user-desired primary content and also differing from the first auxiliary content; wherein the adjusting the duration of the first auxiliary content comprises extending the first auxiliary content into the second time slot and selecting to not display the second auxiliary content during the second time slot.

As can be seen from the above descriptions, mechanisms for increasing user interaction performance with a content presentation device have been presented. In view of the many possible variations of the subject matter described herein, we claim as our invention all such embodiments as may come within the scope of the following claims and equivalents thereto.

We claim:

1. A content presentation device for increasing user efficiency and interaction performance while consuming content, the content presentation device comprising:
   one or more processing units that execute computer-executable instructions;
   a graphics hardware interface communicationally coupling the content presentation device to a physical display device such that the computer-executable instructions being executed by the one or more processing units cause physical changes to the physical display device, thereby generating display content on the physical display device;
   a content presentation application comprising computer-executable instructions which, when executed by at least some of the one or more processing units, cause the content presentation device to perform steps comprising:

displaying, to a user, user-desired primary content on the physical display device;

receiving content pod metadata specifying a plurality of subdivision time slots of a content pod;

receiving a first auxiliary content to display on the physical display device during a first time slot of the content pod, the first auxiliary content differing from the user-desired primary content, wherein a first auxiliary content duration of the received first auxiliary content is equivalent to a first time slot duration of the first time slot;

commencing display of the first auxiliary content on the physical display device within the first time slot of the content pod;

receiving user input during the display of the first auxiliary content on the physical display device, the user input indicative of a user interest in the first auxiliary content;

extending, based on the user interest that is indicated by the received user input, a duration of the first auxiliary content, the extending occurring during the display of the first auxiliary content on the physical display device; and transitioning from the display of the first auxiliary content on the physical display device to a display of the extended duration first auxiliary content on the physical display device during the first time slot.

2. The content presentation device of claim 1, wherein the content presentation application comprises further computer-executable instructions which, when executed by the one or more processing units, cause the content presentation device to perform steps comprising:

receiving a second auxiliary content specifically assigned to a second time slot of the content pod occurring immediately subsequent to the first time slot, the second auxiliary content differing from the user-desired primary content and also differing from the first auxiliary content; and selecting to not display the second auxiliary content during the second time slot because the display of the extended duration first auxiliary content continues into the second time slot.

3. The content presentation device of claim 1, wherein the extending the first auxiliary content comprises receiving a second auxiliary content that is related to the first auxiliary content and is not assigned a specific time slot in the auxiliary content pod; and wherein further the transitioning from the display of the first auxiliary content to the display of the extended duration first auxiliary content comprises completing display of the first auxiliary content during the first time slot and then subsequently displaying the second auxiliary content on the physical display device within a second time slot of the content pod occurring immediately subsequent to the first time slot, the first auxiliary content in combination with the second auxiliary content comprising the extended duration first auxiliary content.

4. The content presentation device of claim 1, wherein the extending the first auxiliary content comprises receiving a second auxiliary content that is a longer duration version of the first auxiliary content; and wherein further the transitioning from the display of the first auxiliary content to the display of the extended duration first auxiliary content comprises completing display of the first auxiliary content during the first time slot and then subsequently displaying only a latter portion of the second auxiliary content on the physical display device within a second time slot of the content pod occurring immediately subsequent to the first time slot.

5. The content presentation device of claim 1, wherein the content presentation application comprises further computer-executable instructions which, when executed by the one or more processing units, cause the content presentation device to perform steps comprising:

receiving a second auxiliary content to display on the physical display device during a second time slot of the content pod, the second auxiliary content differing from the user-desired primary content and also differing from the first auxiliary content;

commencing display of the second auxiliary content on the physical display device within the second time slot of the content pod;

receiving a second user input during the display of the second auxiliary content on the physical display device, the second user input indicative of a user interest in the second auxiliary content;

decreasing, based on the user interest that is indicated by the received user input, a duration of the second auxiliary content, the decreasing occurring during the display of the second auxiliary content on the physical display device such that the display of the decreased duration second auxiliary content during the second time slot completes prior to an end of the second time slot.

6. The content presentation device of claim 1, wherein the receiving the content pod metadata comprises receiving both a first content pod schedule metadata specifying a first plurality of subdivision time slots of the content pod and a second content pod schedule metadata specifying a second, different plurality of subdivision time slots of the content pod; and wherein further the extending the duration of the first auxiliary content comprises ceasing displaying of auxiliary content in accordance with the first content pod schedule, after having already commenced displaying of the auxiliary content in accordance with the first content pod schedule, and then commencing displaying auxiliary content in accordance with the second content pod schedule to accommodate the extended duration first auxiliary content.

7. The content presentation device of claim 1, wherein the receiving the user input comprises receiving implicit user input while displaying the first auxiliary content on the physical display device.

8. The content presentation device of claim 1, wherein the first auxiliary content comprises an advertisement displayed during an advertising break from the primary content.

9. The content presentation device of claim 1, wherein the received first auxiliary content is associated with a first auxiliary content metadata comprising information linking the first auxiliary content to additional auxiliary content that is related to the first auxiliary content.

10. An auxiliary content server that serves auxiliary content, the auxiliary content server comprising:

one or more processing units that execute computer-executable instructions;

a network interface communicatively coupling the content server to a content presentation device such that the content presentation device causes physical changes to a physical display device coupled to the content presentation device, thereby generating display content on the physical display device;

a content pod generation application comprising computer-executable instructions which, when executed by at least some of the one or more processing units, cause the auxiliary content server to perform steps comprising:
  receiving auxiliary content to be displayed on the physical display device during a break from primary content, the auxiliary content being different from the primary content, the auxiliary content comprising:
    a first auxiliary content; and
    a second auxiliary content that is either: (1) an extension of the first auxiliary content or (2) a longer duration version of the first auxiliary content;
  generating content pod metadata specifying: a predefined duration of a content pod delineating display of the auxiliary content within the break from the primary content; a plurality of subdivision time slots of the content pod, and auxiliary content duration extension rules for extending a duration of the first auxiliary content, during a display of the first auxiliary content on the physical display device that is communicationally coupled to the content presentation device, based on the user interest in the first auxiliary content, the first auxiliary content duration extension rules comprising an identification of the second auxiliary content to extend the duration of the first auxiliary content; and
  transmitting the content pod metadata with the auxiliary content over the network interface to the content presentation device.

11. The auxiliary content server of claim 10, wherein the generated content pod metadata specifies content pod schedules, the content pod schedules defining different content pods with different duration time slots in different orders.

12. The auxiliary content server of claim 11, wherein the generated content pod metadata specifies content pod schedule rules, the content pod schedule rules defining rules for selecting different content pod schedules with different duration and different order time slots based on the user interest in the auxiliary content.

13. The auxiliary content server of claim 10, wherein transmitting includes transmitting on-screen auxiliary content duration extension options for presentation to a user on the physical display, the on-screen auxiliary content duration extension options informing the user of options for extending the duration of the auxiliary content.

14. The auxiliary content server of claim 10, wherein the auxiliary content comprises advertising content displayed during an advertising break from the primary content.

15. The auxiliary content server of claim 10, further comprising an auxiliary content tracking application comprising computer-executable instructions which, when executed by at least some of the one or more processing units, cause the auxiliary content server to perform steps comprising: receiving information from the content presentation device indicative of whether the auxiliary content that was presented was extended in duration.

16. The auxiliary content server of claim 10, wherein the auxiliary content duration extension rules further comprise instructions to the content presentation device to complete display of the first auxiliary content during a first time slot, from among the plurality of subdivision time slots of the content pod specified by the generated content pod metadata, and then subsequently to display the second auxiliary content within a second time slot, also from among the plurality of subdivision time slots of the content pod specified by the generated content pod metadata, the second time slot occurring immediately subsequent to the first time slot, such that the first auxiliary content in combination with the second auxiliary content extends the duration of the first auxiliary content.

17. The auxiliary content server of claim 10, wherein the auxiliary content duration extension rules further comprise instructions to the content presentation device to transition from display of the first auxiliary content during a first time slot, from among the plurality of subdivision time slots of the content pod specified by the generated content pod metadata, to display of the second auxiliary content by completing display of the first auxiliary content during the first time slot and then subsequently displaying only a latter portion of the second auxiliary content within a second time slot, also from among the plurality of subdivision time slots of the content pod specified by the generated content pod metadata, the second time slot occurring immediately subsequent to the first time slot.

18. A method of increasing user efficiency and interaction performance while consuming content from a content presentation computing device, the method comprising the steps of:
  receiving, at an auxiliary content server computing device, auxiliary content to be displayed on a physical display device communicationally coupled to the content presentation computing device, the auxiliary content being extendable in duration based on user interest in the auxiliary content;
  receiving, at the auxiliary content server computing device, auxiliary content metadata specifying extendibility in duration of the auxiliary content based on the user interest in the auxiliary content;
  generating, at the auxiliary content server computing device, content pod metadata specifying: a predefined duration of a content pod delineating display of the auxiliary content within the break from a user-desired primary content; a plurality of subdivision time slots of the content pod, and auxiliary content duration extension rules for extending a duration of the auxiliary content based on the user interest in the auxiliary content;
  displaying, to a user, the user-desired primary content on the physical display device;
  receiving, at the content presentation computing device, the content pod metadata;
  receiving, at the content presentation computing device, a first auxiliary content to display on the physical display device during a first time slot of the content pod, the first auxiliary content differing from the user-desired primary content, wherein a first auxiliary content duration of the received first auxiliary content is equivalent to a first time slot duration of the first time slot;
  commencing display of the first auxiliary content on the physical display device within the first time slot of the content pod;
  receiving, at the content presentation computing device, user input during the display of the first auxiliary content on the physical display device, the user input indicative of a user interest in the first auxiliary content;
  extending, at the content presentation computing device, based on the user interest that is indicated by the received user input, a duration of the first auxiliary content, the extending occurring during the display of the first auxiliary content on the physical display device; and
  transitioning from the display of the first auxiliary content on the physical display device to a display of the extended duration first auxiliary content on the physical display device during the first time slot.

19. The method of claim 18, further comprising the steps of:

receiving, at the content presentation computing device, second auxiliary content that is related to the first auxiliary content and is not assigned a specific time slot in the auxiliary content pod;

wherein the transitioning from the display of the first auxiliary content to the display of the extended duration first auxiliary content comprises completing display of the first auxiliary content during the first time slot and then subsequently displaying the second auxiliary content on the physical display device within a second time slot of the content pod occurring immediately subsequent to the first time slot, the first auxiliary content in combination with the second auxiliary content comprising the extended duration first auxiliary content.

20. The method of claim 18, wherein the extending the first auxiliary content comprises receiving, at the content presentation computing device, a second auxiliary content that is related to the first auxiliary content and is not assigned a specific time slot in the auxiliary content pod; and wherein further the transitioning from the display of the first auxiliary content to the display of the extended duration first auxiliary content comprises completing display of the first auxiliary content during the first time slot and then subsequently displaying the second auxiliary content on the physical display device within a second time slot of the content pod occurring immediately subsequent to the first time slot, the first auxiliary content in combination with the second auxiliary content comprising the extended duration first auxiliary content.

21. The method of claim 18, wherein the extending the first auxiliary content comprises receiving, at the content presentation computing device, a second auxiliary content that is a longer duration version of the first auxiliary content; and wherein further the transitioning from the display of the first auxiliary content to the display of the extended duration first auxiliary content comprises completing display of the first auxiliary content during the first time slot and then subsequently displaying only a latter portion of the second auxiliary content on the physical display device within a second time slot of the content pod occurring immediately subsequent to the first time slot.

* * * * *